(12) United States Patent
Dam

(10) Patent No.: US 10,000,359 B2
(45) Date of Patent: Jun. 19, 2018

(54) COLLAPSIBLE CORD SPOOL

(71) Applicant: Tuan Quoc Dam, Round Rock, TX (US)

(72) Inventor: Tuan Quoc Dam, Round Rock, TX (US)

( * ) Notice: Subject to any disclaimer, the term of this patent is extended or adjusted under 35 U.S.C. 154(b) by 165 days.

(21) Appl. No.: 15/188,357

(22) Filed: Jun. 21, 2016

(65) Prior Publication Data

US 2016/0368731 A1 Dec. 22, 2016

Related U.S. Application Data

(60) Provisional application No. 62/183,083, filed on Jun. 22, 2015.

(51) Int. Cl.
| | |
|---|---|
| *B65H 75/22* | (2006.01) |
| *B65H 75/44* | (2006.01) |
| *H01R 13/72* | (2006.01) |
| *H02G 11/02* | (2006.01) |

(52) U.S. Cl.
CPC ......... *B65H 75/22* (2013.01); *B65H 75/4465* (2013.01); *B65H 75/4473* (2013.01); *H01R 13/72* (2013.01); *B65H 2701/34* (2013.01); *H02G 11/02* (2013.01)

(58) Field of Classification Search
CPC ............... B65H 75/22; B65H 75/4465; B65H 75/4473; H01R 13/72
See application file for complete search history.

(56) References Cited

U.S. PATENT DOCUMENTS

| | | | | |
|---|---|---|---|---|
| 3,290,453 A | * | 12/1966 | Jensen | B65H 75/4476 174/135 |
| 4,277,035 A | * | 7/1981 | Gaski | H02G 11/02 242/129 |
| 6,302,347 B1 | * | 10/2001 | Amirault | B65H 75/06 242/388.1 |
| 2010/0224714 A1 | * | 9/2010 | Winther | B65H 75/446 242/400.1 |

* cited by examiner

*Primary Examiner* — Sang K Kim
(74) *Attorney, Agent, or Firm* — Kirk Dorius; Dorius Law PC

(57) ABSTRACT

A collapsible cord spool 100 includes a base 102, defining one or more pivots 104, 106, and mounted to a power converter block 108 having a cord 110. The collapsible cord spool 100 further defines first and second cord cleats 112, 114. The first and second cord cleats 112, 114 include opposed projections 116, 118. The first and second cord cleats 112, 114 are movable about one or more pivots 104, 106 and may be stowed or deployed. In the deployed position, the first and second cord cleats 112, 114 define a cord wrapping region 302 to receive windings of the cord 110.

13 Claims, 7 Drawing Sheets

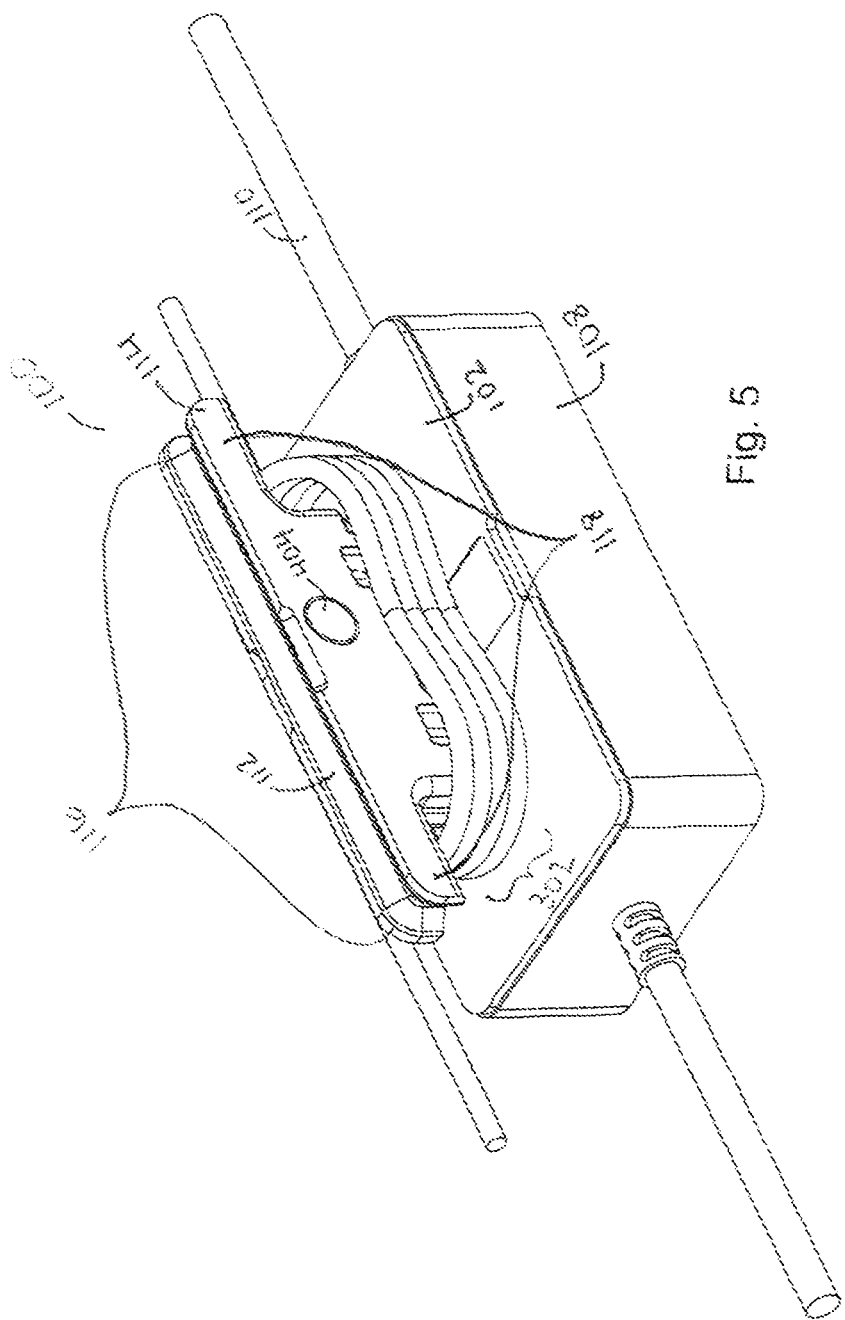

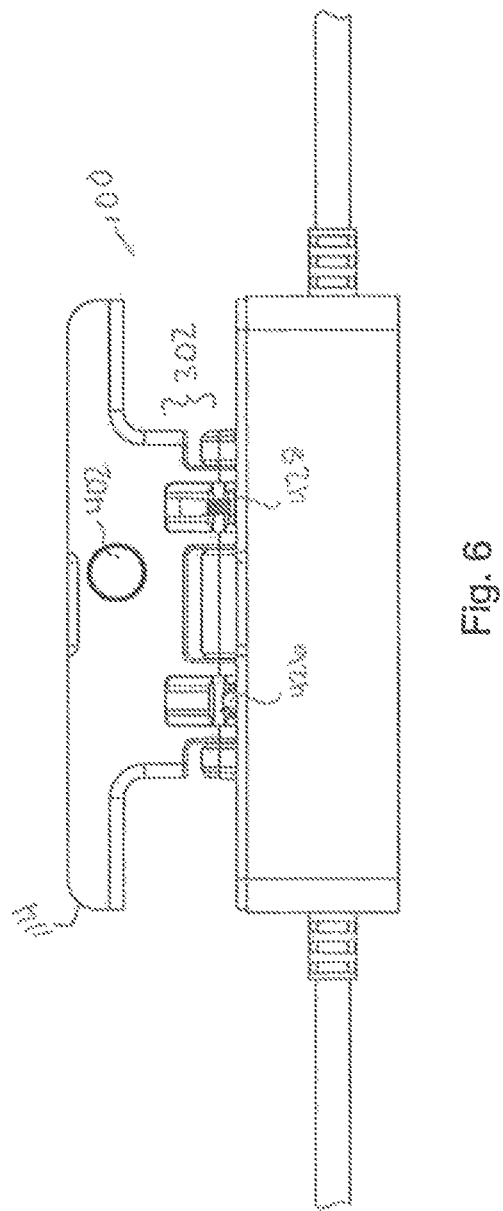

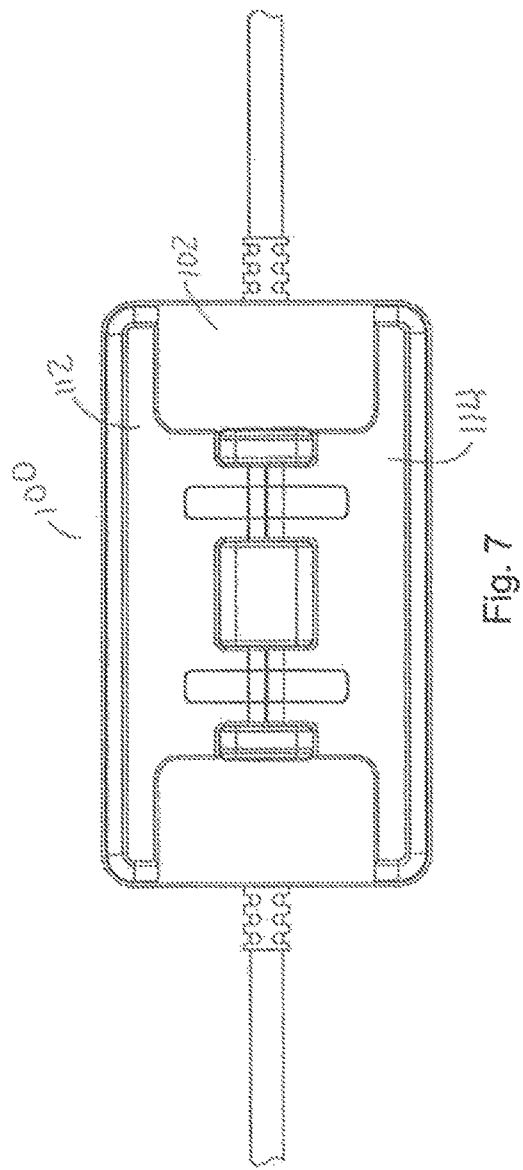

COLLAPSIBLE CORD SPOOL

CROSS-REFERENCE TO RELATED APPLICATIONS

This application claims priority to U.S. Provisional Application No. 62/183,083 filed Jun. 22, 2015 and titled "Collapsible Cord Spool", which is incorporated herein in its entirety by reference.

FIELD OF INVENTION

This invention generally relates to cord keepers, and in particular to a collapsible cord spool mechanism used to store, organize or keep an elongated power cord.

BACKGROUND OF THE INVENTION

Power cords and cables are common features of many devices utilized in daily activities. For example, most electronic devices include a cable in order to provide a source of power, networking, internet, etc. While some existing devices may offer a retractable cord reel, the majority simply incorporate a cord length extending from a power converter block or between the plug and device. Alternatively, separate cord binders such as touch fastener wraps or plastic ties can be provided or purchased for use in maintaining cords in a coiled or stowed state.

Cord length, thickness, or stiffness can sometimes make spooling or storage more difficult. Additionally, too tight of coiling or kinking during transportation or storage can compromise the integrity of the cord, e.g., due to fraying or breakage. Cord damage can lead to problems with performance, reliability, or functionality and can result in the need for costly repairs or replacement. Accordingly, improvements are sought in storage options related to corded devices.

SUMMARY OF THE INVENTION

While the way that the present invention addresses the disadvantages of the prior art will be discussed in greater detail below, in general, the present invention provides a collapsible cord spool that encompasses movable cord cleats to receive a cord, improving portability and storage aspects of the desired device.

One aspect of the invention features, in some embodiments, a collapsible cord spool including a mounting base, having one or more pivots, and first and second cord cleats. The cord cleats are movable about the pivot(s) between a stored position adjacent to the mounting base and a deployed position abutting the other of the first and second cord cleats. The first and second cord cleats include respective opposed projections that define, in the deployed position, a cord wrapping region between the projections and the base.

In some embodiments, the collapsible cord spool includes one or more magnets that are configured to maintain the first and second cord cleats in abutment in the deployed position.

In some embodiments, the one or more magnets are configured to maintain the first and second cord cleats in the stored position adjacent to the base.

In some embodiments, the collapsible cord spool includes one or more springs biasing at least one of the first and second cord cleats towards the deployed position.

In some embodiments, the collapsible cord spool includes an adhesive strip for mounting the base.

In some embodiments, the collapsible cord spool includes holes to allow for mounting the base using screws.

In some embodiments, the collapsible cord spool is part of an OEM power block.

In some embodiments, the collapsible cord spool is configured as a retrofit to an existing power block.

Another aspect of the invention features a retrofit power-converter-block collapsible cord cleat mechanism including a mounting base configured for attachment to a power converter block, and first and second cord cleats pivotally coupled to the mounting base to be movable between a first stowed position proximate to the mounting base and a second deployed position extending away from the mounting base. The first and second cord cleats define one or more projections or "wings" and a recess between a respective wing and the mounting base to receive windings of a cord associated with a power converter block.

In some embodiments, the retrofit power converter block includes a spring system comprising one or more torsion springs.

In some embodiments, the first and second cord cleats are biased towards a stowed position.

In some embodiments, the first and second cord cleats are biased towards a deployed position.

In some embodiments, the retrofit power converter block includes a magnetic connection system comprising one or more magnets that allows for separation and joining of the first and second cord cleats of the collapsible cord cleat mechanism.

In some embodiments, the retrofit power converter block includes a snap fit connection system that allows for separation and joining of the mounting base and the first and second cord cleats of the collapsible cord cleat mechanism.

Another aspect of the invention features a method of manufacturing a collapsible cord spool. The method includes providing a mounting base and pivotally attaching first and second collapsible cord cleats to the mounting base to be movable between a stowed position adjacent the mounting base and a deployed position extending from the mounting base. The first and second collapsible cord cleats have one or more wings defining respective openings to receive windings of a cord about the first and second collapsible cord cleats between the one or more wings and the mounting base.

In some applications, the method includes biasing the first and second collapsible cord cleats away from the mounting base.

In some applications, the method includes configuring the first and second collapsible cords to couple together in the deployed position.

In some applications, the collapsible cord cleats are couplable via at least one of snap-fit, magnets, and interlocking features.

Accordingly, the present invention provides an improved collapsible cord spool apparatus.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

FIG. 5 is a perspective view of the collapsible cord spool of FIG. 1 with a cord wrapped around the cord cleats.

FIG. 6 is a side view of the collapsible cord spool of FIG. 1 in the deployed position.

FIG. 7 is a top view of the collapsible cord spool of FIG. 1 in the stowed position.

DETAILED DESCRIPTION

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, compositions and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Figure 1:
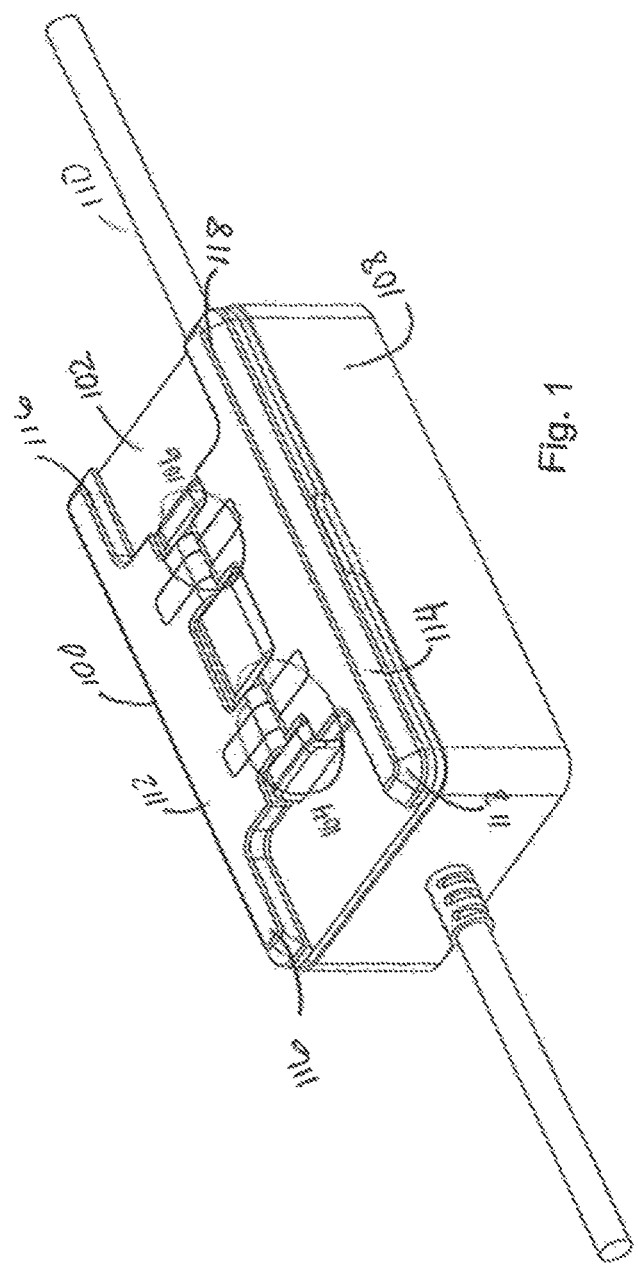
FIG. 1 is a perspective view of a collapsible cord spool mounted to a power converter block according to one embodiment.
Figure 2:
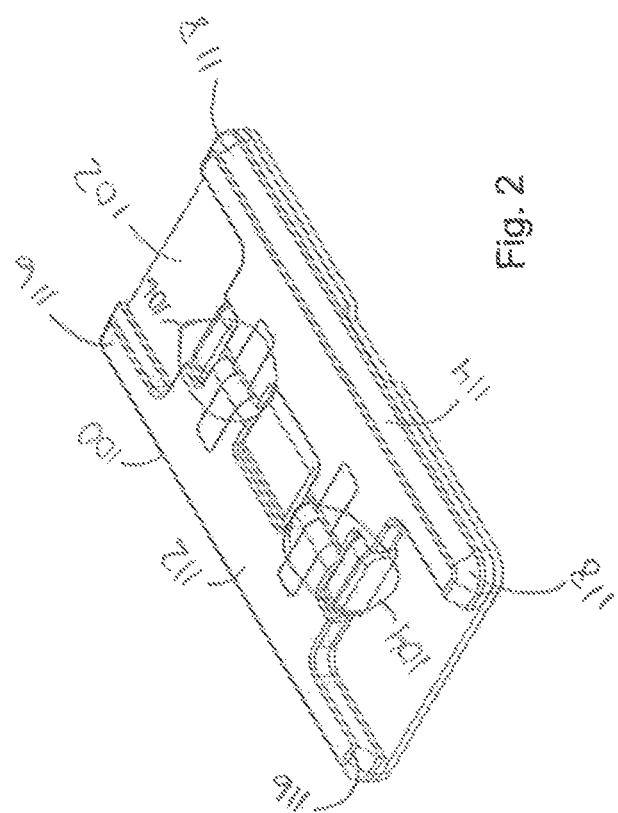
FIG. 2 is a perspective view of the collapsible cord spool of FIG. 1 with cord cleats in the stowed position.
Figure 3:
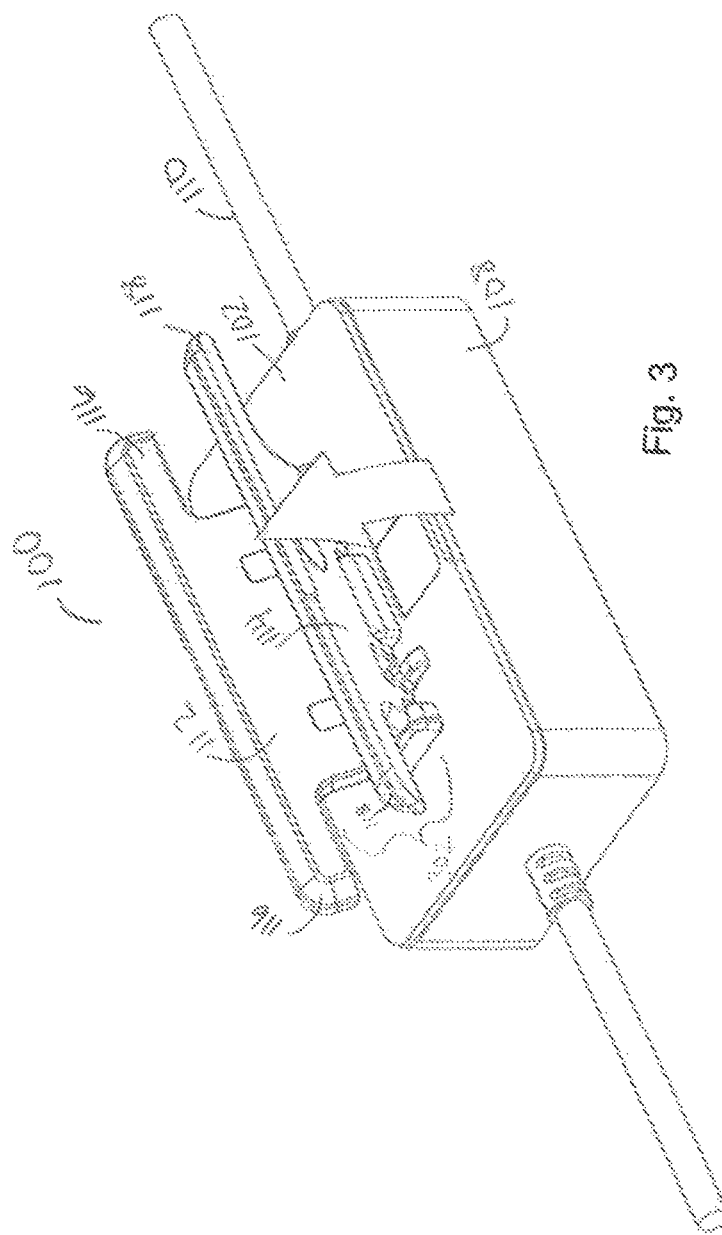
FIG. 3 is a perspective view of the collapsible cord spool of FIG. 1 with cord cleats in the deployed position mounted to the power converter block.

With reference to FIGS. 1-3, in some embodiments a collapsible cord spool 100 includes a base 102, sometimes referred to herein as a "mounting base," defining one or more pivots 104, 106. The base 102 of the collapsible cord spool 100 is mounted to a power converter block 108 having a cord 110. The collapsible cord spool 100 further defines first and second cord cleats 112, 114. The first and second cord cleats 112, 114 include opposed projections 116, 118, respectively, sometimes referred to as "wings" herein.

The first and second cord cleats 112, 114 are movable about the one or more pivots 104, 106 and are shown in a stored position adjacent to the base 102 in FIG. 2. In other embodiments, the first and second cord cleats 112, 114 may be in a partially deployed or fully deployed position abutting the other of the first and second cord cleats 112, 114 as shown in FIG. 3. When in the deployed position of FIG. 3, the first and second cord cleats 112, 114 define a cord wrapping region 302 between the first and second cord cleats 112, 114 and the base 102. The cord wrapping region 302 comprises a recess defined between the respective cord cleat and the base 102 to receive windings of the cord 110 associated with the power converter block 108.

Figure 4:
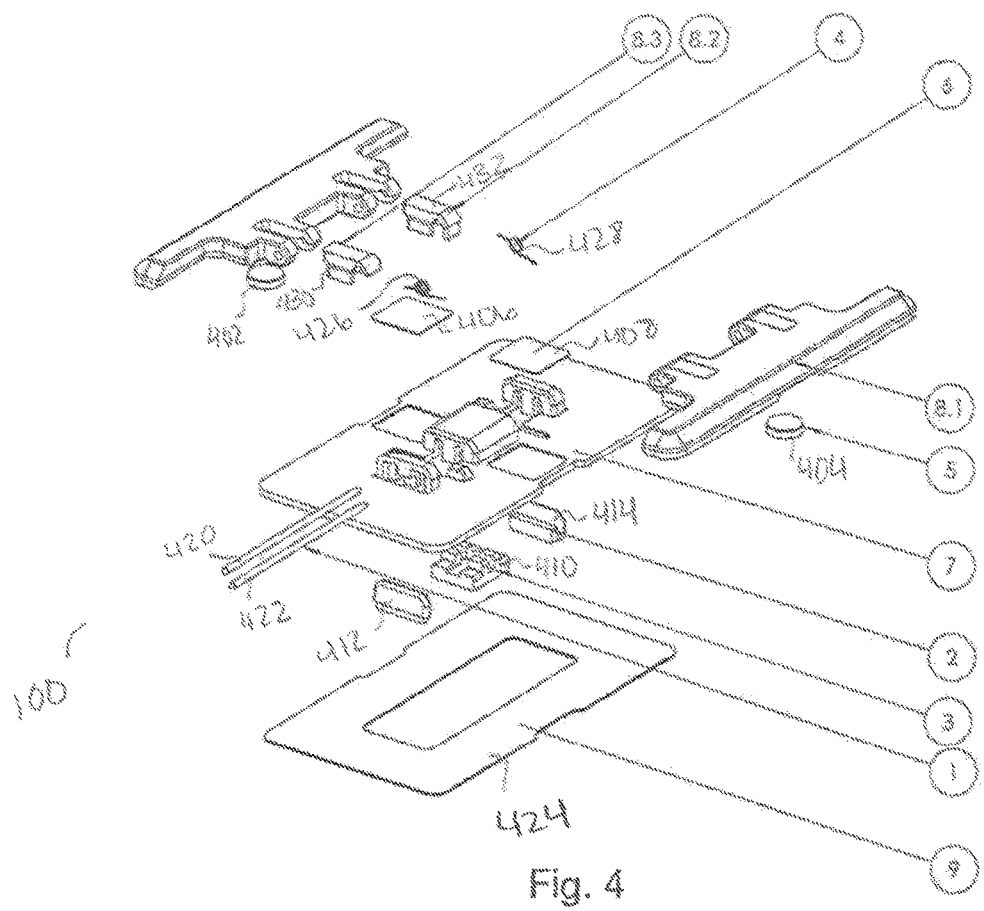
FIG. 4 is an exploded view of the collapsible cord spool of FIG. 1.

With reference now to FIG. 4, depicting an exploded view of the collapsible cord spool 100 of FIG. 1, in some embodiments the collapsible cord spool 100 includes one or more magnets 402, 404 located on or near a surface of the first and second cord cleats 112, 114. The one or more magnets 402, 404 can be joined with one or more magnet plates 406, 408, together making up a magnetic connection system that allows for the separation and joining of the base 102 and the first and second cord cleats 112, 114. The one or more magnets 402, 404 can maintain the first and second cord cleats 112, 114 in abutment in the partially deployed position shown in FIG. 3 and can also maintain the first and second cord cleats 112, 114 in the stored position adjacent to the base 102, as shown in FIGS. 1 and 2. In other embodiments, the collapsible cord spool 100 may comprise different types of connection systems not pictured. For example, the collapsible cord spool 100 may implement a snap-fit connection system that allows for the separation and joining of the first and second cord cleats 112, 114 with the base 102.

Additionally shown in FIG. 4, in some embodiments, the base 102 of the collapsible cord spool 100 includes center support molding 410, one or more endcaps 412, 414, and one or more swivel pins 420, 422. The one or more endcaps 412, 414 are positioned on either side of the center support molding 410, with the one or more endcaps 412, 414, the center support molding 410, and the one or more cord cleats 112, 114 including openings to receive the one or more swivel pins 420, 422, thereby joining the first and second cord cleats 112, 114 to the base 102. One or more fillers 430, 432 may be included and positioned adjacently to the first and second cord cleats 112, 114. The one or more fillers 430, 432 may be utilized to secure the one or more swivel pins 420, 422 in place once they are inserted.

Further shown in FIG. 4, in some embodiments, the collapsible cord spool 100 includes an adhesive strip 424 for mounting the base 102 to a desired surface such as the power converted block 108 shown in FIG. 1. One or more springs 426, 428 receive the one or more swivel pins 420, 422 adjacent the first and second cord cleats 112, 114. The one or more springs 426, 428 comprise a spring system and may be a variety spring types including, but not limited to, torsion springs that may bias the first and second cord cleats 112, 114 towards the deployed position shown in FIG. 3. The one or more springs 426, 428 apply a pressure to the first and second cord cleats 112, 114 allowing for the first and second cord cleats 112, 114 to be raised away from, and lowered towards, the base 102 depending on if a deployed or stowed position is desired. Note, in some embodiments, different mounting strategies may be implemented in lieu of the adhesive strip 424. For example, the base 102 may incorporate openings that will allow mounting via drilling or other means.

With reference now to FIG. 5, in some embodiments the collapsible cord spool 100 includes the first and second cord cleats 112, 114 in a fully-deployed position abutting the other of the first and second cord cleats 112, 114. The first and second cord cleats 112, 114 include wings, or opposed projections 116, 118, respectively. When in the fully deployed position, the first and second cord cleats 112, 114 define a cord wrapping region 302 between the first and second cord cleats 112, 114 and the base 102. The cord wrapping region 302 comprises a recess between the respective cord cleat and the base 102 to receive windings of the cord 110 associated with the power converter block 108. The opposed projections 116, 118 serve to hold the cord 110 in place to prevent migration of the cord during stowage or transport.

In some embodiments, when fully deployed, pressure may be applied to the first and second cord cleats 112, 114 allowing for the cord 110 to be released without requiring unwinding from the cord wrapping region 302. For example, the cord cleats may be pliable, foldable, or telescoping to allow the cord to be more readily released from a coiled state.

The collapsible cord spool 100 of FIG. 5 shows a magnetic connection system including one or more magnets 402, 404 (402 not shown) located on the first and second cord cleats 112, 114. The one or more magnets 402, 404 create a magnetic connection allowing for the separation and joining of the base 102 and the first and second cord cleats 112, 114. The magnetic connection allows for the first and second cord cleats 112, 114 to be joined in an upright or fully-deployed position until the magnetic contact is terminated. In some embodiments, a snap-fit connection system may be implemented that allows for the joining and separation of the first and second cord cleats 112, 114. The snap-fit connection system may employ a locating and locking feature to adjacently join together the first and second cord cleats 112, 114 in a fully-deployed position.

With reference now to FIG. 6, the collapsible cord spool 100 of FIG. 1 is shown in a fully deployed from a side view perspective. The first and second cord cleats 112, 114 (112 not shown) are joined adjacently by one or more magnets 402, 404 (402 not shown) to create the cord wrapping region 302. The first and second cord cleats 112, 114 are fully deployed via pressure applied by the one or more springs 426, 428 comprising the spring system.

With reference now to FIG. 7, the collapsible cord spool 100 of FIG. 1 is shown in a fully-stowed position from a top-view perspective. The first and second cord cleats 112, 114 are shown joined adjacent to the base 102. The first and second cord cleats 112, 114 may be joined to the base 102 by the magnetic connection system shown in FIGS. 4-6 or other connection mechanisms such as the snap-fit connection system described herein.

Finally, while the present invention has been described above with reference to various exemplary embodiments, many changes, combinations and modifications may be made to the exemplary embodiments without departing from the scope of the present invention. For example, the various components may be implemented in alternative ways. One such example may implement the collapsible cord spool 100 by incorporating internally the collapsible cord spool 100 into a main body of a device. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A collapsible cord spool comprising:
a base defining one or more pivots; and
first and second cord cleats movable about the one or more pivots between a stored position adjacent the base and a deployed position abutting the other of the first and second cord cleats, wherein the first and second cord cleats include respective opposed projections that define, in the deployed position, a cord wrapping region between the projections and the base.

2. The collapsible cord spool of claim 1, further comprising one or more magnets configured to maintain the first and second cord cleats in abutment in the deployed position.

3. The collapsible cord spool of claim 2, wherein the one or more magnets is further configured to maintain at least one of the first and second cord cleats in the stored position adjacent the base.

4. The collapsible cord spool of claim 1, further comprising one or more springs biasing at least one of the first and second cord cleats towards the deployed position.

5. The collapsible cord spool of claim 1, wherein the first and second cord cleats together comprise a snap fit in the deployed position.

6. The collapsible cord spool of claim 1, further comprising an adhesive strip for mounting the base.

7. A retrofit power converter block collapsible cord spool comprising:
a mounting base configured for attachment to a power converter block; and
first and second cord cleats pivotally coupled to the mounting base to be moveable between a first stowed position proximate the mounting base and a second deployed position extending away from the mounting base and abutting the other of the first and second cord cleats, wherein each of the first and second cord cleats defines one or more wings and a recess between a respective wing and the mounting base to receive windings of a cord associated with the power converter block.

8. The retrofit power converter block collapsible cord spool of claim 7, further comprising a spring system comprising one or more torsion springs.

9. The retrofit power converter block collapsible cord cleat of claim 7, further comprising a magnetic connection system comprising one or more magnets to allow separation and joining of the mounting base and the first and second cord cleats.

10. The retrofit power converter block collapsible cord cleat of claim 7, further comprising a snap fit connection system to allow separation and joining of the mounting base and the first and second hinging structures.

11. A method of manufacturing a collapsible cord spool comprising:
providing a mounting base;
pivotally attaching first and second collapsible cord cleats to the mounting base to be moveable between a stowed position adjacent the mounting base and a deployed position extending from the mounting base, the first and second collapsible cord cleats having one or more wings defining respective openings to receive windings of a cord about the first and second collapsible cord cleats between the one or more wings and the mounting base; and
configuring the first and second collapsible cord cleats to couple together in the deployed position.

12. The method of claim 11, further comprising biasing the first and second collapsible cord cleats away from the mounting base.

13. The method of claim 11, wherein the collapsible cord cleats are couplable via at least one of snap-fit, magnets, and interlocking features.

* * * * *